United States Patent
Protter

(10) Patent No.: US 10,534,443 B2
(45) Date of Patent: *Jan. 14, 2020

(54) METHOD AND SYSTEM FOR GENERATING A SYNTHETIC DATABASE OF POSTURES AND GESTURES

(71) Applicant: Infinity Augmented Reality Israel Ltd., Petach-Tikva (IL)

(72) Inventor: Matan Protter, Kiryat Ono (IL)

(73) Assignee: Alibaba Technology (Israel) Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,827

(22) Filed: Jul. 5, 2019

(65) Prior Publication Data

US 2019/0332181 A1    Oct. 31, 2019

Related U.S. Application Data

(63) Continuation of application No. 15/339,957, filed on Nov. 1, 2016, now Pat. No. 10,345,914.
(Continued)

(51) Int. Cl.
*G06F 3/01* (2006.01)
*G06F 16/901* (2019.01)
(Continued)

(52) U.S. Cl.
CPC ............ *G06F 3/017* (2013.01); *G06F 16/901* (2019.01); *G06N 20/00* (2019.01); *G06N 3/006* (2013.01)

(58) Field of Classification Search
CPC ..................................................... G06F 3/017
See application file for complete search history.

(56) References Cited

U.S. PATENT DOCUMENTS

| 2008/0059578 A1 | 3/2008 | Albertson et al. |
| 2008/0124690 A1 | 5/2008 | Redlich |
| (Continued) | | |

FOREIGN PATENT DOCUMENTS

| GB | 2419433 | 4/2006 |
| KR | 20100066866 | 6/2010 |
| WO | WO 2015/192117 | 12/2015 |

OTHER PUBLICATIONS

Search Report from European Patent Application No. EP17743849.6 dated Aug. 26, 2019.

*Primary Examiner* — Phi Hoang
(74) *Attorney, Agent, or Firm* — Pearl Cohen Zedek Latzer Baratz LLP

(57) ABSTRACT

Methods and systems for generating synthetic samples of postures and gestures are provided. In one embodiment, the system may include: a database configured to store at least one sample of a posture or a gesture; a sensing device; and a computer processor configured to: derive values of parameters relating to a specific user and/or environment and generate datasets of gesture and posture samples based on the derived values. In another embodiment, a computer memory may be configured to: obtain at least one gesture or posture of at least one body part; and obtain data sets affecting the appearance of said postures and gestures; and a computer processor configured to generate sets of synthetic samples of said postures and gestures, based on the obtained data sets, wherein the synthetic samples embody virtual variations caused by at least one of the obtained data sets.

20 Claims, 4 Drawing Sheets

Related U.S. Application Data

(60) Provisional application No. 62/286,981, filed on Jan. 26, 2016.

(51) Int. Cl.
 *G06N 20/00* (2019.01)
 *G06N 3/00* (2006.01)

(56) References Cited

U.S. PATENT DOCUMENTS

| | | |
|---|---|---|
| 2008/0136895 A1 | 6/2008 | Mareachen |
| 2008/0192005 A1 | 8/2008 | Elgoyhen et al. |
| 2010/0281440 A1 | 11/2010 | Underkoffer et al. |
| 2012/0092286 A1 | 4/2012 | O'Prey et al. |
| 2012/0224787 A1 | 9/2012 | Imai |
| 2013/0282637 A1 | 10/2013 | Costigan et al. |
| 2015/0130743 A1 | 5/2015 | Li |
| 2015/0346834 A1 | 12/2015 | Martinez Fernandez et al. |
| 2016/0110044 A1 | 4/2016 | Andrews et al. |
| 2016/0134840 A1 | 5/2016 | McCulloch |
| 2017/0192665 A1 | 7/2017 | Karmon |

METHOD AND SYSTEM FOR GENERATING A SYNTHETIC DATABASE OF POSTURES AND GESTURES

CROSS-REFERENCE TO RELATED APPLICATIONS

This application is a continuation of the U.S. patent application Ser. No. 15/339,957, filed Nov. 1, 2016, issued as U.S. Pat. No. 10,345,914 on Jul. 9, 2019, which claims the benefit of U.S. Provisional Patent Application No. 62/286,981, filed Jan. 26, 2016, both of which are hereby incorporated by reference in their entirety.

FIELD OF THE INVENTION

The present invention relates generally to natural user interface (NUI), and more particularly to synthetically generating a database of samples that are sufficient for training a NUI system.

BACKGROUND OF THE INVENTION

Natural User interface (NUI) devices have become ever more popular with gesture capturing systems of various technologies being used to recognize gestures and postures of body parts of users.

Generally speaking, two types of NUI devices are currently available. The first type is configured for operating with many users and it would be advantageous to be able to train NUI devices of the first type to be able to operate properly with as much users as may be possible. The second type of NUI devices are configured to only work with a single user but it is unknown in advance which user will eventually use the NUI device.

Both of the aforementioned types of NUI devices lead to a training challenge: the first type poses a generalization challenge, while the second type poses a challenge of specialization.

SUMMARY OF THE INVENTION

Some embodiments of the present invention provide a method and a system for generating a large database of samples suitable for training natural user interface (NUI) of various types. Specifically, the database may store samples for training gesture recognition, hand detection, 3D hand modeling, face recognition, and full body recognition. This is achieved by using a graphics system that can render realistic simulations of human motion.

Thus, one aspect of the present invention provides the generalization of potential users of a NUI system, possibly carried out at the manufacturer of the NUI device so that the model will be able to address as many variants as possible. The other aspect is specialization of the NUI device, to be carried out at the user side, and to be as tailored as possible to a specific user.

According to some embodiments of the present invention, a system architect determines what postures and or gestures need to be supported. At that stage, the architect also determines either himself or by obtaining automatically which parameters to vary for (usually from a list). The system architect then collects or gets from a database values of the parameters for all scenarios. The architect then may receive at least one posture or gesture, either by capturing in real life or creating a simulation of it. Then, after feeding all the required data, the method in accordance with embodiments of the present invention generates a database based on required combination of parameters.

The aforementioned process may be carried out possibly where NUI system is manufactured, and the following stages may be implemented in order to achieve it: obtaining at least one gesture or posture of at least one body part of one or more persons; obtaining data sets affecting the appearance of said postures and gestures; and generating sets of synthetic samples of the postures and gestures, based on the obtained data sets. It is noted that the synthetic samples embody virtual variations caused by at least one of the obtained data sets.

In a different embodiment, and in an operation phase, while the NUI system may be already in the hands of the end user, the database may be rendered and customized on a per-user and/or per-environment basis. In order to achieve a quick "fine tuning" of the NUI system, the user may be required to provide a capturing of his or her relevant body parts (participating in the gestures and postures) and the database may be generated automatically for the specified gestures and postures, and for the specified camera and measured lighting conditions, in a quick manner.

Advantageously, since the samples on the database are all synthetically generated, each and every sample of a captured gesture or motion, is associated with exact geometric arrangement of the modeled body part, the texture, skin tone, lighting condition and actually any parameter that affect the capturing. Additionally and preferably, the synthetically generated samples will have a typical noise applied to them. In a case that the capturing system generates a depth map, the Z-buffer serves as the framework for the samples, with all of the aforementioned advantages of knowledge of the parameters related to the exact motion, distance of the body part, texture, and lighting conditions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
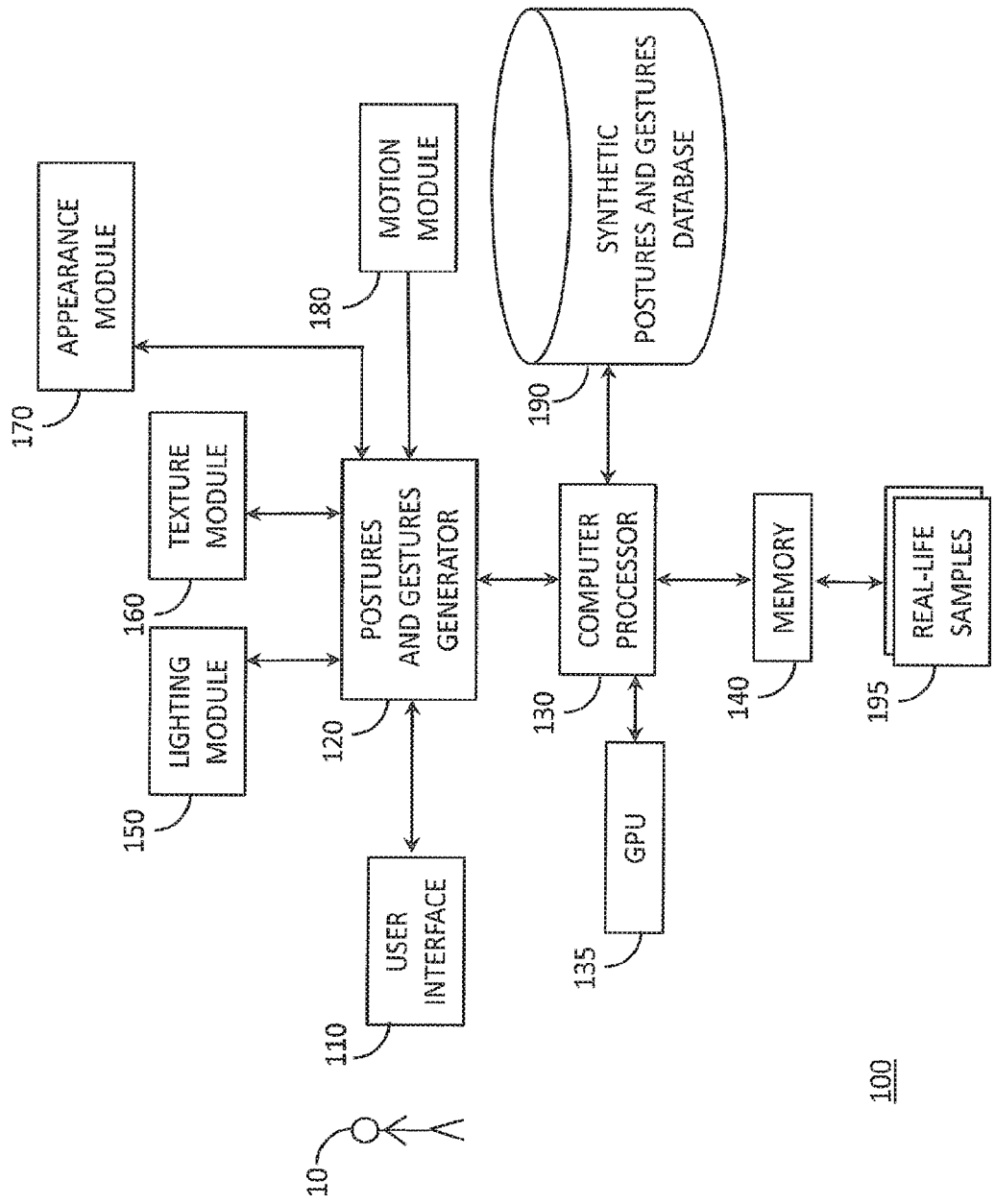
FIG. 1 is a block diagram illustrating non-limiting exemplary architecture of a system for generating a generalized database of synthetic samples in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment, a system for generating a database of synthetic samples of postures and gestures is provided herein. The system may include a memory configured to store at least one gesture or posture of at least one body part of one or more persons; and a computer processor configured to: determine use case-specific values of parameters of factors affecting the appearance of said postures and gestures; and generate use case-specific synthetic samples of said postures and gestures, based on the obtained use case-specific values of parameters, wherein the synthetic samples embody virtual variations caused by at least one of the obtained use case-specific values.

FIG. 1 is a block diagram illustrating non-limiting exemplary architecture of a system for generating a generalized database of synthetic samples of postures and gestures in accordance with some embodiments of the present invention. System 100 may include a computer processor 130 connected to a memory 140 on which sets of instructions may be loaded to be executed by computer processor 130. System 100 may include several software modules that may be executed by computer processor 130 and possibly by an optional graphical processing unit (GPU) 135. Such software modules may include (but are not limited to) a postures and gestures generator 120, a lighting module 150, a texture module 160, an appearance module 170, and a motion module 180.

In operation, memory 140 may be configured to obtain at least one gesture or posture of at least one body part of one or more persons (not shown here). Memory 140 may be further configured to obtain data sets affecting the appearance of the postures and gestures.

Then, responsive to selection of parameters, possibly by an architect 10 and over a user interface 110, computer processor 130, using postures and gestures generator 120 which in turn may use lighting module 150, texture module 160, appearance module 170, and motion module 180, may be configured to generate sets of synthetic samples of said postures and gestures, based on the obtained data sets to be stored on synthetic postures and gestures database 190.

Specifically, the synthetic samples stored on synthetic postures and gestures database 190 may be configured to embody virtual variations caused by at least one of the obtained data sets.

In accordance with some embodiments of the present invention, the generation of the samples is further based on real-life samples 195 (e.g., of actual people captured waving their hands for example). Alternatively, no real-life samples may be required and the synthetic samples can be generated in a full synthetic manner.

Specifically, lighting module 150 may be configured to provide varying lighting conditions, texture module 160 may be configured to provide varying textures of human users and/or clothing items, appearance module 170 may be configured to provide varying sizes, shapes, and colors of body parts and/or clothing items, whereas motion module 180 may be configured to provide varying motion parameters such as speed and acceleration of body parts of users.

According to some embodiments of the present invention, the synthetic database 190 may contain several types of valid motions which are distinguishable from each other, types of motions that should be ignored as they are not valid (e.g., they do not translate to a meaningful action based on the gesture/posture recognition system) as well as some other non-meaningful "noise" samples that serve as negative examples.

In accordance with other embodiments of the present invention, the database is generated using different configurations of cameras—based on various parameters that define the camera properties such as field of view (FOV), resolution, sensor size, and the like.

Figure 2:
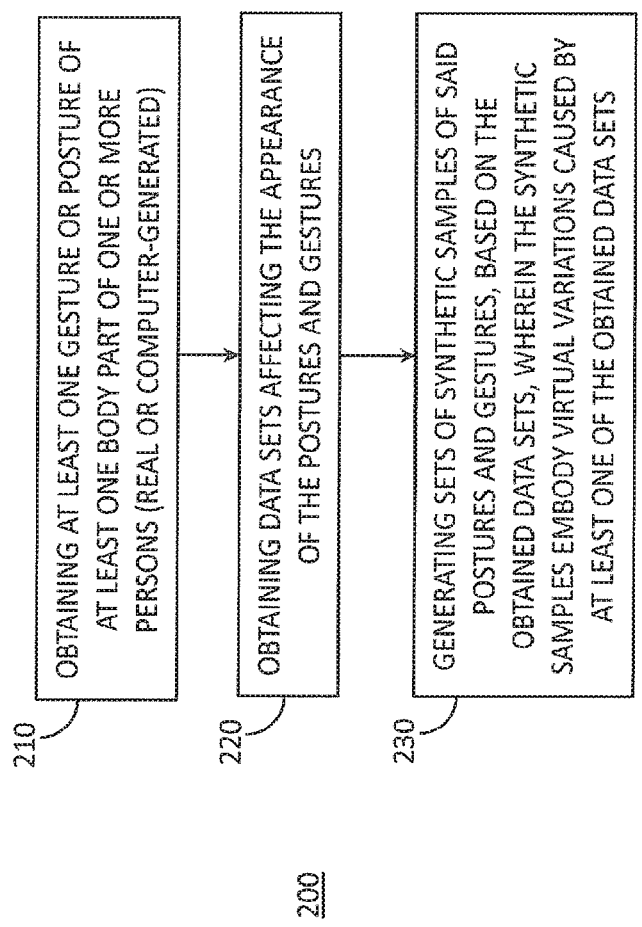
FIG. 2 is a high level flowchart illustrating non-limiting exemplary method in accordance with embodiments of the present invention.

FIG. 2 is a high level flowchart illustrating non-limiting exemplary method of generating a database of synthetic samples of postures and gestures, in accordance with embodiments of the present invention. Method 200 may include the following steps: obtaining at least one gesture or posture of at least one body part of one or more persons 210; obtaining data sets affecting the appearance of said postures and gestures 220; and generating sets of synthetic samples of said postures and gestures, based on the obtained data sets 230, wherein the synthetic samples embody virtual variations caused by at least one of the obtained data sets.

Figure 3:
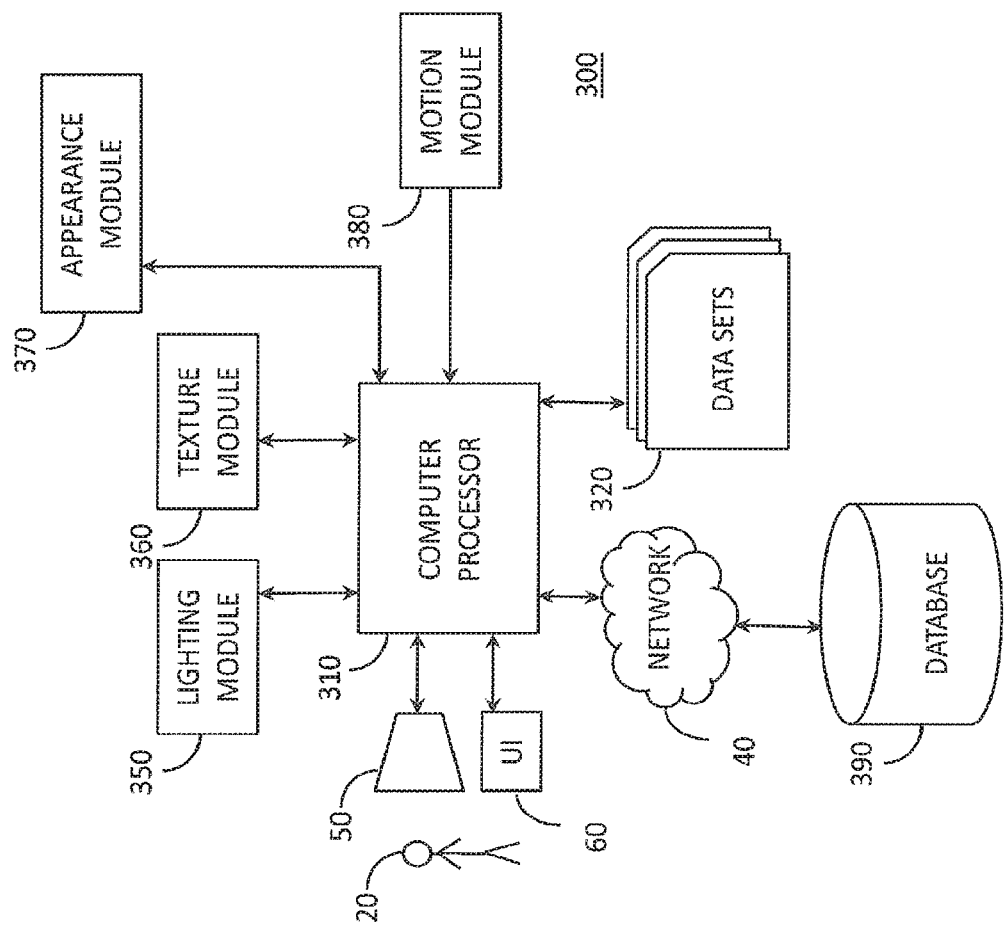
FIG. 3 is a block diagram illustrating non-limiting exemplary architecture of a system for generating a tailored database of synthetic samples in accordance with embodiments of the present invention.

FIG. 3 is a block diagram illustrating non-limiting exemplary architecture of a system for rendering use case specific data sets of synthetic samples of postures and gestures, in accordance with some embodiments of the present invention. System 300 may include a database 390 configured to store at least one sample of a posture or a gesture and may possibly be either located locally or located in a remote location and may communicate over a network 40. System 300 may also include a sensing device 50 (which can be a webcam connected to a PC); and a computer processor 310. System 300 may include several software modules that may be executed by computer processor 310. Such software modules may include: a lighting module 350, a texture module 360, an appearance module 370, and a motion module 380.

In operation, computer processor 310 may be configured to derive values of parameters relating to a specific user, wherein the derived parameters are predefined upon generating database 390 (possibly similar to database 190 described herein in reference to FIG. 1 but more preferably merely a subset thereof that is sufficient to generate some synthetic samples but not all possible variants as database 190). Computer processor 310 may be further configured to generate datasets 320 of gesture and posture samples based on the derived values, possibly by using lighting module 350, texture module 360, appearance module 370, and motion module 380.

According to some embodiments of the present invention, system 300 may further include a user interface 60 configured to monitor a sampling process of data of a user by sensing device 50.

As explained above, and according to some embodiments of the present invention, database 390 may be connected remotely to the computer processor via a network 40. The sensing device 50 may be a webcam operated via a PC of user 20. Thus, in a minimal implementation, the actual device near user 20 include only the computer processor and the generated datasets, which in some embodiments can also be stored remotely and accessed via a network (e.g., via a cloud). In yet another embodiment of the invention, the computer processor that carries out the adaptation to a specific device may be located remotely (e.g., on a cloud), and the resultant database or classifier produced by the computer processor remotely is then transferred to a local device. Alternatively, it can also be sent to a different cloud in a case further processing takes place there.

In accordance with some other embodiments of the present invention, a dataset may be generated on a per-user and/or per-ambience basis. A hand or another body part of a user may be captured for deriving the texture of the body part participating in the posture or the gestures. Then, the system automatically generates the samples of the gestures and the postures and uses the captured texture implemented on the synthetic postures and gestures. It should be noted therefore that the textures are not related to the postures or the gestures themselves, but rather to the body that is performing the gesture.

Figure 4:
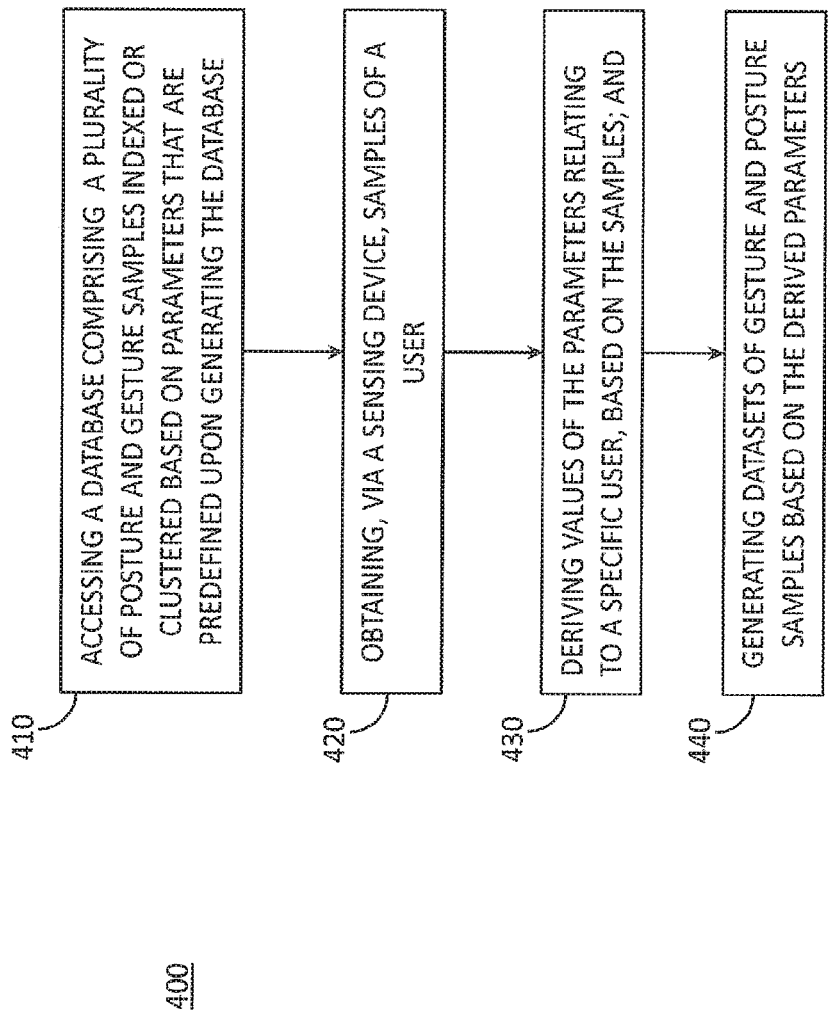
FIG. 4 is a high level flowchart illustrating another non-limiting exemplary method in accordance with embodiments of the present invention.

FIG. 4 is a high level flowchart illustrating the method of rendering datasets of synthetic samples of postures and gestures for a specific user, in accordance with embodiments of the present invention. Method 400 may include the following steps: accessing a database comprising a plurality of posture and gesture samples indexed (or possibly clustered) based on parameters that are predefined upon generating said database 410; obtaining, via a sensing device, samples of a user 420; deriving values of the parameters relating to a specific user, based on the samples 430; and generating datasets of gesture and posture samples based on the derived parameters 440.

According to some embodiments of the present invention, some of the parameters that are related to the end-user for the database generated either at the factory (generalized database) or as the end user (scenario-specific, at the end user) may be user-dependent and may include at least some of: texture of the bodily part which may relate to: skin tone, hair, clothing (e.g., sleeves, gloves).

Additionally, the overall appearance may be parameterized into, for example: shape of the body part, dimensions (length (e.g., of arm, of finger), and width), motion speed (e.g., in case the gesture is "waving"—the rate or frequency of the waving); motion "arc" (i.e., a specific gesture does not have to have a full path, but start late and/or end early such as in a "Hello" gesture, waving the arm left to right. In a base gesture, it goes from 45 degrees to the left to 45 degrees to the right. But it can be from −30° to +30°, or −45° to +30°, or −30° to +45°, and the like).

Additionally, environment conditions can also be parameterized using at least some of the following metrics: lighting conditions which include light color (yellow, white, and the like) but also the shape of the light source such as single light source, light-bulb, florescent, ambient light, projectors, and the like. The environment also includes backgrounds in particular static backgrounds (horizon, single color wall, colored wall, furniture, and the like) but also moving backgrounds (dynamic scene, capturing during motion, crowd of people).

In addition, the sensor conditions may also be parameterized based on at least some of the following metrics: sensor type (camera, depth sensor, other sensing devices), wherein for cameras the following parameters can be used: sensor wavelength range such as visible light, monochrome, Infra-Red (IR); rolling/global shutter; sensor resolution; and field of view (FOV).

According to some embodiments of the present invention, at the factory side where the system is being manufactured, an architect may configure the database to encompass a subset of the possible database by the following process: determine what set of gestures and/or postures the database should contain (if for training, determine a set of positive and/or negative example); determine which parameters that effect the capture of the poses/gestures (from list above); determine possible values/value-ranges for such parameters, e.g.: samples of skin-tones and/or clothing types (rendered and/or sampled from actual users); Typical lighting conditions.

The architect then can go on to determine the set of combinations of parameters to employ. This could be the full set (all combinations) or a subset determined either manually, randomly, or through some decision process, automated or manual (e.g., which is meant to make sure every specific parameter is represented at least N times, such as N=3).

The architect then can go on to determine for each posture/gesture a "base" set, which could either be: collected from one or more individuals, one or more Synthetically created (in a simulation and/or modelling software) or a combination thereof. It should be noted that in some embodiments no real world samples are actually needed.

The architect then can go on to determine rendering using a common or proprietary or special developed rendering engine, variations of the pose and/or gesture, by adjusting for each one of the combinations determined previously.

Then, in operation, the aforementioned database can be used either for training a classifier offline, and applying it online. Additionally or alternatively the database can be used for classification online, by using sorts of nearest-neighbor classification such as by measuring distances in an N-dimensional space.

In accordance with some embodiments of the present invention, in an exemplary non-limiting use case, computer processor 310 may be further configured to generate an avatar based on samples obtained (possibly via sensing unit 50) from one end user (e.g., user 20) by applying a sequence of postures and/or gestures derived from a second end-user (possibly a sequence that describes a specified dance) stored on synthetic database 390. Thus, the generated avatar may include, for example, a synthetic image of a dancing figure having the mobility characteristics of the second user and the appearance of a first user (e.g. user 20).

In order to implement methods 200 and 400 according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, some aspects of the present invention may be embodied as a system, method or computer program product. Accordingly, some aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, some aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for rendering tailored data sets of synthetic samples of postures and gestures, the system comprising:
   a computer processor configured to:
   communicate with a database configured to store at least one sample of a posture or a gesture;
   derive values of a set of parameters relating to a specific user and/or environment, wherein the set of parameters to derive values for are predefined upon generating said database; and
   generate datasets of synthetic gesture and posture samples based on the derived values, wherein the synthetic gesture and posture samples do not represent gestures and postures that are obtained in the real world.

2. The system according to claim 1, wherein the computer processor tailors said datasets per user sampled by a sensing device.

3. The system according to claim 1, further comprising a user interface configured to monitor sampling of data of a user by a sensing device.

4. The system according to claim 1, wherein said database is connected remotely by the computer processor via a network.

5. The system according to claim 1, wherein said set of parameters comprises at least one of: textures relating to the specific user and/or environment; motion parameters of said body part; size of said body part; distance from said body part; capturing device parameters of a sensing device; and lighting parameters of the specified environment.

6. The system according to claim 1, wherein the computer processor is further configured to train a classifier for detecting at least one posture or gesture, based on the generated database.

7. The system according to claim 1, wherein the computer processor is further configured to generate an avatar based on samples obtained from one end user by applying a sequence of postures and/or gestures derived from a second end-user stored in the database.

8. The system according to claim 1, further comprising the database configured to store the at least one sample of a posture or a gesture.

9. A method of rendering synthetic samples of postures and gestures, the method comprising:
   communicating with a database comprising a plurality of posture and gesture samples indexed based on parameters that are predefined upon generating said database;
   receiving samples relating to appearance of postures or gestures obtained via a sensing device;
   deriving values of the parameters relating to the appearance of postures or gestures, based on the samples; and
   generating datasets of synthetic gesture and posture samples based on the derived parameters, wherein the synthetic gesture and posture samples do not represent gestures and postures that are obtained in the real world.

10. The method according to claim 9, further comprising tailoring said datasets per user sampled by a sensing device.

11. The method according to claim 9, further comprising monitoring the sampling of the data of the user via a user interface.

12. The method according to claim 9, further comprising communicating with said database remotely via a network.

13. The method according to claim 9, wherein said set of parameters comprises at least one of: textures relating to the specific user and/or environment; motion parameters of said body part; size of said body part; distance from said body part; capturing device parameters of a sensing device; and lighting parameters of the specified environment.

14. The method according to claim 9, further comprising training a classifier for detecting at least one posture or gesture, based on the database.

15. A non-transitory computer readable medium for rendering synthetic samples of postures and gestures, the non-transitory computer readable medium comprising a set of instructions that when executed cause at least one processor to:
communicate with a database comprising a plurality of posture and gesture samples indexed based on parameters that are predefined upon generating said database;
receive samples relating to appearance of postures or gestures obtained via a sensing device;
derive values of the parameters relating to the appearance of postures or gestures, based on the samples; and
generate datasets of synthetic gesture and posture samples based on the derived parameters, wherein the synthetic gesture and posture samples do not represent gestures and postures that are obtained in the real world.

16. The non-transitory computer readable medium according to claim 15, wherein the set of instructions further cause the at least one processor to tailor said datasets per user sampled by a sensing device.

17. The non-transitory computer readable medium according to claim 15, wherein the set of instructions further cause the at least one processor to monitor the sampling of the data of the user via a user interface.

18. The non-transitory computer readable medium according to claim 15, wherein the set of instructions further cause the at least one processor to communicate with said database remotely via a network.

19. The non-transitory computer readable medium according to claim 15, wherein said set of parameters comprises at least one of: textures relating to the specific user and/or environment; motion parameters of said body part; size of said body part; distance from said body part; capturing device parameters of a sensing device; and lighting parameters of the specified environment.

20. The non-transitory computer readable medium according to claim 15, wherein the set of instructions further cause the at least one processor to train a classifier for detecting at least one posture or gesture, based on the database.

* * * * *